United States Patent
Xiang et al.

(10) Patent No.: US 11,809,201 B1
(45) Date of Patent: Nov. 7, 2023

(54) METHOD AND SYSTEM FOR HIERARCHICAL DISTURBANCE REJECTION DEPTH TRACKING CONTROL OF UNDERACTUATED UNDERWATER VEHICLE

(71) Applicant: HUAZHONG UNIVERSITY OF SCIENCE AND TECHNOLOGY, Hubei (CN)

(72) Inventors: Xianbo Xiang, Hubei (CN); Chuan Liu, Hubei (CN); Shaolong Yang, Hubei (CN); Gong Xiang, Hubei (CN); Qin Zhang, Hubei (CN)

(73) Assignee: HUAZHONG UNIVERSITY OF SCIENCE AND TECHNOLOGY, Hubei (CN)

( * ) Notice: Subject to any disclaimer, the term of this patent is extended or adjusted under 35 U.S.C. 154(b) by 0 days.

(21) Appl. No.: 18/324,171

(22) Filed: May 26, 2023

(30) Foreign Application Priority Data

Sep. 9, 2022 (CN) .......................... 202211102526.1

(51) Int. Cl.
*G05D 1/04* (2006.01)
*B63G 8/24* (2006.01)
*B63G 8/18* (2006.01)
*B63G 8/00* (2006.01)

(52) U.S. Cl.
CPC .............. *G05D 1/048* (2013.01); *B63G 8/24* (2013.01); *B63G 8/18* (2013.01); *B63G 2008/004* (2013.01)

(58) Field of Classification Search
CPC ........ G05D 1/048; G05D 1/0692; B63G 8/24; B63G 8/18; B63G 2008/004; B63H 1/36
See application file for complete search history.

(56) References Cited

U.S. PATENT DOCUMENTS

| | | | |
|---|---|---|---|
| 2001/0044246 A1* | 11/2001 | McCarthy | C22F 1/04 441/64 |
| 2015/0284064 A1* | 10/2015 | Dufour | B63C 11/42 114/332 |
| 2017/0277189 A1* | 9/2017 | Johnson | B63H 25/06 |
| 2018/0065744 A1* | 3/2018 | Park | B64C 27/08 |
| 2019/0135393 A1* | 5/2019 | Pieterkosky | B63B 35/44 |
| 2021/0261226 A1* | 8/2021 | Johnson | B63B 79/15 |
| 2021/0269128 A1* | 9/2021 | Rivers | B63B 79/40 |
| 2022/0145756 A1* | 5/2022 | Vagata | G05D 1/0206 |

* cited by examiner

*Primary Examiner* — Masud Ahmed
(74) *Attorney, Agent, or Firm* — JCIPRNET

(57) ABSTRACT

The disclosure provides a method and system for hierarchical disturbance rejection depth tracking control of an underactuated underwater vehicle, and the depth tracking of the underactuated underwater vehicle is divided into kinematic layer guidance and dynamic layer pitch tracking. Adaptive line of sight guidance is used in the kinematic layer to convert a depth error into a desired pitch angle and to estimate and compensate an angle of attack to reject disturbance introduced by an unmeasurable true angle of attack. Based on the above, in the dynamic layer, the active disturbance rejection sliding mode pitch tracking method is used to observe a composite disturbance including an unknown dynamic model and an environmental disturbance by using the active disturbance rejection framework. The model is compensated as a unified integral series type, a sliding mode control law is finally designed to resist an observation error, and a control elevator angle is calculated.

6 Claims, 6 Drawing Sheets

METHOD AND SYSTEM FOR HIERARCHICAL DISTURBANCE REJECTION DEPTH TRACKING CONTROL OF UNDERACTUATED UNDERWATER VEHICLE

CROSS-REFERENCE TO RELATED APPLICATION

This application claims the priority benefit of Chinese application serial no. 202211102526.1, filed on Sep. 9, 2022. The entirety of the above-mentioned patent application is hereby incorporated by reference herein and made a part of this specification.

BACKGROUND

Technical Field

The disclosure belongs to the field of automatic control of vehicles, and in particularly, relates to a method and system for hierarchical disturbance rejection depth tracking control of an underactuated underwater vehicle.

Description of Related Art

Autonomous underwater vehicles are crucial in ocean surveys and underwater operations such as resource exploration, seabed mapping, underwater salvage, and maintenance of marine structures. Underactuated autonomous underwater vehicles, in particular, have played an important role in reconnaissance and search tasks due to their simple structure and good hydrodynamic performance. The motion control of the autonomous underwater vehicles is directly related to the efficiency and quality of the above tasks. Depth tracking capability, in particular, is one of the necessary and key motion capabilities of the autonomous underwater vehicles. However, the depth tracking control of underactuated autonomous underwater vehicles faces difficulties such as underactuation, model nonlinearity, strong coupling of motion, and external environment disturbance, which makes it difficult to guarantee the accuracy of depth tracking. Therefore, the capability of disturbance rejection of the depth tracking control of the underactuated underwater autonomous vehicle is particularly critical.

SUMMARY

In view of the defects of the related art, the disclosure aims to provide a method and system for hierarchical disturbance rejection depth tracking control of an underactuated underwater vehicle and aims to solve the problem that it is difficult to guarantee the depth tracking accuracy of currently-available underwater vehicles with the presence of disturbance.

To achieve the above, in the first aspect, the disclosure provides a method for hierarchical disturbance rejection depth tracking control of an underactuated underwater vehicle, and the method includes the following steps.

Navigation information of the underwater vehicle is determined. The navigation information includes a desired depth, a current depth, a current navigation speed, and a current pitch angle.

A depth tracking error is determined according to the desired depth and the current depth, and the depth tracking error is converted into a desired pitch angle based on an adaptive line-of-sight guidance law. The adaptive line-of-sight guidance law includes an adaptive parameter, so as to estimate a real angle of attack of the underwater vehicle and reduce a motion disturbance introduced by ignoring the angle of attack. The adaptive parameter is determined according to the current navigation speed and the depth tracking error.

An active disturbance rejection-sliding mode pitch tracking control law including an extended state observer and a sliding mode feedback control law is determined. The extended state observer is configured to observe a composite disturbance of the underwater vehicle. The composite disturbance is a sum of dynamic disturbances introduced by an internal structure of the vehicle and an external environment. An observation error of the extended state observer is considered in a design process of the sliding mode feedback control law and is combined with the desired pitch angle to calculate an elevator angle of the underwater vehicle, so that the observation error is overcome.

An observed amount of the composite disturbance and the elevator angle calculated through the sliding mode feedback control law in combination with the active disturbance rejection sliding mode pitch tracking control law are determined. Further, a final elevator angle is calculated based on the observed amount of the composite disturbance and the elevator angle calculated through the sliding mode feedback control law, so that the elevator navigates according to the final elevator angle, and that the underwater vehicle navigates stably according to the desired depth. The final elevator angle is calculated according to the adaptive line-of-sight guidance law and the active disturbance rejection-sliding mode pitch tracking control law, so that the underwater vehicle is capable of providing improved rejection to motion disturbance and dynamic disturbance, and accuracy of depth tracking of the underwater vehicle is improved.

In an optional embodiment, the depth tracking error being determined according to the desired depth and the current depth and the depth tracking error being converted into the desired pitch angle based on the adaptive line-of-sight guidance law specifically includes the following.

A current depth z is subtracted from a desired depth $z_d$ to obtain the depth tracking error $e_z$.

The depth tracking error $e_z$ is converted into a desired pitch angle $\theta_d$ based on the adaptive line-of-sight guidance law specifically through the following formula:

$$\theta_d = \tan^{-1}\left(\frac{e_z}{\Delta} + \hat{\alpha}\right),$$

where $\Delta$ is the forward-looking distance, and $\hat{\alpha}$ is the adaptive parameter.

$\hat{\alpha}$ changes adaptively according to the following formula:

$$\dot{\hat{\alpha}} = \frac{\gamma U \Delta e_z}{\sqrt{\Delta^2 + (e_z + \Delta\hat{\alpha})^2}},$$

where U is the navigation speed of the vehicle, and $\gamma$ is the adaptive gain.

In an optional embodiment, the extended state observer being configured to observe the composite disturbance of the underwater vehicle specifically includes the following.

A pitch motion model of the underwater vehicle is:

$$\ddot{\theta} = f(\theta,\dot{\theta},U,I_{yy}\ldots) + b_0\delta + d_\theta,$$

where $\ddot{\theta}$ represents the pitch angular acceleration rate, $f(\theta,\dot{\theta}, U, I_{yy} \ldots)$ represents the acceleration rate corresponding to the moment caused by the internal structure of the vehicle, $\theta$ represents the vehicle pitch angle, $\dot{\theta}$ represents the vehicle pitch angular velocity, U represents the navigation speed, $I_{yy}$ represents the moment of inertia of the vehicle, $d_\theta$ is the external environment disturbance, $b_0$ is the elevator effect coefficient, and d is the final elevator angle.

$f(\theta, \dot{\theta}, U, I_{yy} \ldots)+d_\theta$ is considered as the composite disturbance, and the composite disturbance is iteratively calculated using the following extended state observer:

$$\begin{cases} e = z_1[t] - \theta \\ z_1[t+1] = z_1[t] + h(z_2[t+1] - l_1 e) \\ z_2[t+1] = z_2[t] + h(z_3[t+1] - l_2 e + b_0 \delta) \\ z_3[t+1] = z_3[t] + h(-l_3 e) \end{cases},$$

where $z_1$, $z_2$, and $z_3$ respectively are observed amounts of the vehicle pitch angle $\theta$, the pitch angular velocity $\dot{\theta}$, and the compound disturbance $f(\theta, \dot{\theta}, U, I_{yy} \ldots)+d_\theta$, [t] represents the iterative calculation of step t, h is the integration step size, and $l_1$, $l_2$ and $l_3$ are the observation gains of the extended state observer.

In an optional embodiment, the active disturbance rejection sliding mode pitch tracking control law further includes a tracking differentiator configured to determine a numerical differential $v_2$ of the desired pitch angle and a tracking signal $v_1$ of the desired pitch angle.

The observation error of the extended state observer being considered in the design process of the sliding mode feedback control law and being combined with the desired pitch angle to calculate the elevator angle of the underwater vehicle specifically includes the following.

A sliding mode surface $s=ce_1+e_2$ is defined, where c is the weight coefficient, $e_1$ is the pitch angle tracking error, $e_1=v_1-z_1$, $e_2$ is the pitch angular velocity tracking error, and $e_2=v_2-z_2$.

The sliding mode feedback control law is obtained according to an exponential reaching law design method:

$$\delta_0 = \frac{1}{b_0}(ce_2 + ks + \eta\mathrm{sign}(s)),$$

where $\delta_0$ is the elevator angle calculated through the sliding mode feedback control law, the k parameter controls the rate at which the error converges to zero exponentially, and $\eta$ is the coefficient of the robust term to overcome the observation error.

$v_1$ and $v_2$ are calculated through the following formula:

$$\begin{cases} v_1[t+1] = v_1[t] + hv_2[t+1] \\ v_2[t+1] = v_2[t] + h \cdot fhan(x_1, x_2, r, h) \end{cases},$$

where r is the tracking acceleration coefficient, h is the calculation step size, [t] represents the iterative calculation of step t, $fhan(x_1, x_2, r, h)$ is the fastest control comprehensive function, $x_1$ and $x_2$ are intermediate variables expressed as $x_1=v_1[t]-\theta_d$ and $x_2=v_2[t]$ respectively, and $\theta_d$ is the desired pitch angle.

Herein, $fhan(x_1, x_2, r, h)$ is calculated through the following formula:

$$\begin{cases} d = rh \\ d_0 = hd \\ y = x_1 + hx_2 \\ a_0 = \sqrt{d^2 + 8r|y|} \\ a = \begin{cases} x_2 + \frac{a_0 - d}{2}\mathrm{sign}(y), & |y| > d_0 \\ x_2 + \frac{y}{h}, & |y| \le d_0 \end{cases} \\ fhan(x_1, x_2, r, h) = -\begin{cases} r\mathrm{sign}(a), & |a| > d \\ r\frac{a}{d}, & |a| \le d \end{cases} \end{cases},$$

where d, $d_0$, $\gamma$, $\alpha_0$, and $\alpha$ are all intermediate variables.

In an optional embodiment, the final elevator angle $\delta$ calculated based on the observed amount of the composite disturbance and the elevator angle calculated through the sliding mode feedback control law specifically is $$\delta = \delta_0 - \frac{z_3}{b_0}.$$

In the second aspect, the disclosure provides a system for hierarchical disturbance rejection depth tracking control of an underactuated underwater vehicle, includes:

The navigation information determining unit is configured to determine navigation information of the underwater vehicle. The navigation information includes a desired depth, a current depth, a current navigation speed, and a current pitch angle.

The desired pitch angle determining unit is configured to determine a depth tracking error according to the desired depth and the current depth and convert the depth tracking error into a desired pitch angle based on an adaptive line-of-sight guidance law. The adaptive line-of-sight guidance law includes an adaptive parameter, so as to estimate a real angle of attack of the underwater vehicle and reduce a motion disturbance introduced by ignoring the angle of attack. The adaptive parameter is determined according to the current navigation speed and the depth tracking error.

The pitch tracking control law determining unit is configured to determine an active disturbance rejection-sliding mode pitch tracking control law including an extended state observer and a sliding mode feedback control law. The extended state observer is configured to observe a composite disturbance of the underwater vehicle. The composite disturbance is a sum of dynamic disturbances introduced by an internal structure of the vehicle and an external environment. An observation error of the extended state observer is considered in a design process of the sliding mode feedback control law and is combined with the desired pitch angle to calculate an elevator angle of the underwater vehicle, so that the observation error is overcome.

The elevator angle determining unit is configured to determine an observed amount of the composite disturbance and the elevator angle calculated through the sliding mode feedback control law in combination with the active disturbance rejection-sliding mode pitch tracking control law. Further, the elevator angle determining unit calculates a final elevator angle based on the observed amount of the composite disturbance and the elevator angle calculated through the sliding mode feedback control law, so that the elevator navigates according to the final elevator angle, and that the underwater vehicle navigates stably according to the desired depth. The elevator angle determining unit calculates the final elevator angle according to the adaptive line-of-sight guidance law and the active disturbance rejection sliding mode pitch tracking control law, so that the underwater vehicle is capable of providing improved rejection to motion disturbance and dynamic disturbance, and accuracy of depth tracking of the underwater vehicle is improved.

In an optional embodiment, the desired pitch angle determining unit determining the depth tracking error according to the desired depth and the current depth and converting the depth tracking error into the desired pitch angle based on the adaptive line-of-sight guidance law specifically includes the following. A current depth z is subtracted from a desired depth $z_d$ to obtain the depth tracking error $e_z$. The depth tracking error $e_z$ is converted into a desired pitch angle $\theta_d$ based on the adaptive line-of-sight guidance law specifically through the following formula:

$$\theta_d = \tan^{-1}\left(\frac{e_z}{\Delta} + \hat{\alpha}\right),$$

where $\Delta$ is the forward-looking distance, and $\hat{\alpha}$ is the adaptive parameter. $\hat{\alpha}$ changes adaptively according to the following formula:

$$\hat{\alpha} = \frac{\gamma U \Delta e_z}{\sqrt{\Delta^2 + (e_z + \Delta \hat{\alpha})^2}},$$

where U is the navigation speed of the vehicle, and $\gamma$ is the adaptive gain.

In an optional embodiment, the extended state observer being configured to observe the composite disturbance of the underwater vehicle specifically includes the following.

A pitch motion model of the underwater vehicle is:

$$\ddot{\theta} = f(\theta, \dot{\theta}, U, I_{yy} \ldots) + b_0 \delta + d_\theta,$$

where $\ddot{\theta}$ represents the pitch angular acceleration rate, $f(\theta, \dot{\theta}, U, I_{yy} \ldots)$ represents the acceleration rate corresponding to the moment caused by the internal structure of the vehicle, $\theta$ represents the vehicle pitch angle, $\dot{\theta}$ represents the vehicle pitch angular velocity, U represents the navigation speed, $I_{yy}$ represents the moment of inertia of the vehicle, $d_\theta$ is the external environment disturbance, $b_0$ is the elevator effect coefficient, and $\delta$ is the final elevator angle, $f(\theta, \dot{\theta}, U, I_{yy} \ldots) + d_\theta$ is considered as the composite disturbance, and the composite disturbance is iteratively calculated using the following extended state observer:

$$\begin{cases} e = z_1[t] - \theta \\ z_1[t+1] = z_1[t] + h(z_2[t+1] - l_1 e) \\ z_2[t+1] = z_2[t] + h(z_3[t+1] - l_2 e + b_0 \delta) \\ z_3[t+1] = z_3[t] + h(-l_3 e) \end{cases},$$

where $z_1$, $z_2$, and $z_3$ respectively are observed amounts of the vehicle pitch angle $\theta$, the pitch angular velocity $\dot{\theta}$, and the compound disturbance $f(\theta, \dot{\theta}, U, I_{yy} \ldots) + d_\theta$, [t] represents the iterative calculation of step t, h is the integration step size, and $l_1$, $l_2$ and $l_3$ are the observation gains of the extended state observer.

In an optional embodiment, the active disturbance rejection sliding mode pitch tracking control law further includes a tracking differentiator configured to determine a numerical differential $v_2$ of the desired pitch angle and a tracking signal $v_1$ of the desired pitch angle.

The observation error of the extended state observer being considered in the design process of the sliding mode feedback control law and being combined with the desired pitch angle to calculate the elevator angle of the underwater vehicle specifically includes the following.

A sliding mode surface $s = c e_1 + e_2$ is defined, where c is the weight coefficient, $e_1$ is the pitch angle tracking error, $e_1 = v_1 - z_1$, $e_2$ is the pitch angular velocity tracking error, and $e_2 = v_2 - z_2$.

The sliding mode feedback control law is obtained according to an exponential reaching law design method:

$$\delta_0 = \frac{1}{b_0}(ce_2 + ks + \eta \text{sign}(s)),$$

where $\delta_0$ is the elevator angle calculated through the sliding mode feedback control law, the k parameter controls the rate at which the error converges to zero exponentially, and $\eta$ is the coefficient of the robust term to overcome the observation error.

$v_1$ and $v_2$ are calculated through the following formula:

$$\begin{cases} v_1[t+1] = v_1[t] + h v_2[t+1] \\ v_2[t+1] = v_2[t] + h \cdot fhan(x_1, x_2, r, h) \end{cases},$$

where r is the tracking acceleration coefficient, h is the calculation step size, [t] represents the iterative calculation of step t, $fhan(x_1, x_2, r, h)$ is the fastest control comprehensive function, $x_1$ and $x_2$ are intermediate variables expressed as $x_1 = v_1[t] - \theta_d$ and $x_2 = v_2[t]$ respectively, and $\theta_d$ is the desired pitch angle.

Herein, $fhan(x_1, x_2, r, h)$ is calculated through the following formula:

$$\begin{cases} d = rh \\ d_0 = hd \\ y = x_1 + hx_2 \\ a_0 = \sqrt{d^2 + 8r|y|} \\ a = \begin{cases} x_2 + \frac{a_0 - d}{2}\text{sign}(y), & |y| > d_0 \\ x_2 + \frac{y}{h}, & |y| \le d_0 \end{cases} \\ fhan(x_1, x_2, r, h) = -\begin{cases} r\text{sign}(a), & |a| > d \\ r\frac{a}{d}, & |a| \le d \end{cases} \end{cases}$$

where d, $d_0$, $\gamma$, $\alpha_0$, and $\alpha$ are all intermediate variables.

In an optional embodiment, the elevator angle determining unit determines the final elevator angle $\delta$ calculated based on the observed amount of the composite disturbance and the elevator angle calculated through the sliding mode feedback control law specifically to be $$\delta = \delta_0 - \frac{z_3}{b_0}.$$

DESCRIPTION OF THE EMBODIMENTS

In order to make the objectives, technical solutions, and advantages of the disclosure clearer and more comprehensible, the disclosure is further described in detail with reference to the drawings and embodiments. It should be understood that the specific embodiments described herein serve to explain the disclosure merely and are not used to limit the disclosure.

The disclosure provides a method and system for hierarchical disturbance rejection depth tracking control of an underactuated underwater vehicle, and the disclosure belongs to the field of automatic control. In the disclosure, the depth tracking of the underactuated underwater vehicle is divided into kinematic layer guidance and dynamic layer pitch tracking. Adaptive line of sight guidance is used in the kinematic layer to convert a depth error into a desired pitch angle and to estimate and compensate the angle of attack to reject the disturbance introduced by the unmeasurable true angle of attack. Based on the above, in the kinematic layer, the active disturbance rejection sliding mode pitch tracking method is used to observe the composite disturbance including an unknown dynamic model and an environmental disturbance by using the active disturbance rejection framework. The model is compensated as a unified integral series type, the sliding mode control law is finally designed to resist an observation error, and the control elevator angle is calculated. The abovementioned control method is deployed on the on-board computer of the vehicle, so that the data fed back by the sensor is read, the elevator actuator is controlled, the system for hierarchical disturbance rejection depth tracking control is formed, and the robust depth tracking navigation of the vehicle is implemented.

The disclosure designs a method for hierarchical disturbance rejection depth tracking control of an underactuated autonomous underwater vehicle. In the method, the depth tracking control of the vehicle is divided into the kinematic layer adaptive line of sight angle guidance law and the dynamic layer active disturbance rejection sliding mode pitch tracking control law, and the two resist disturbances from both the kinematic layer and the dynamic layer, so that the accuracy of depth tracking under the disturbances is improved.

It can be understood that, starting from the actual technical means provided by the disclosure, it is obvious that the method for hierarchical anti-disturbance depth tracking control of the underwater vehicle provided by the disclosure is not only applicable to an underactuated autonomous underwater vehicle, but also applicable to the control of other types of underwater vehicles. The purpose of the technical means provided by the disclosure is to improve the accuracy of depth tracking of an underwater vehicle. The specific type of underwater vehicle cannot substantially limit the protection scope of the technical solutions of the disclosure.

Figure 1:
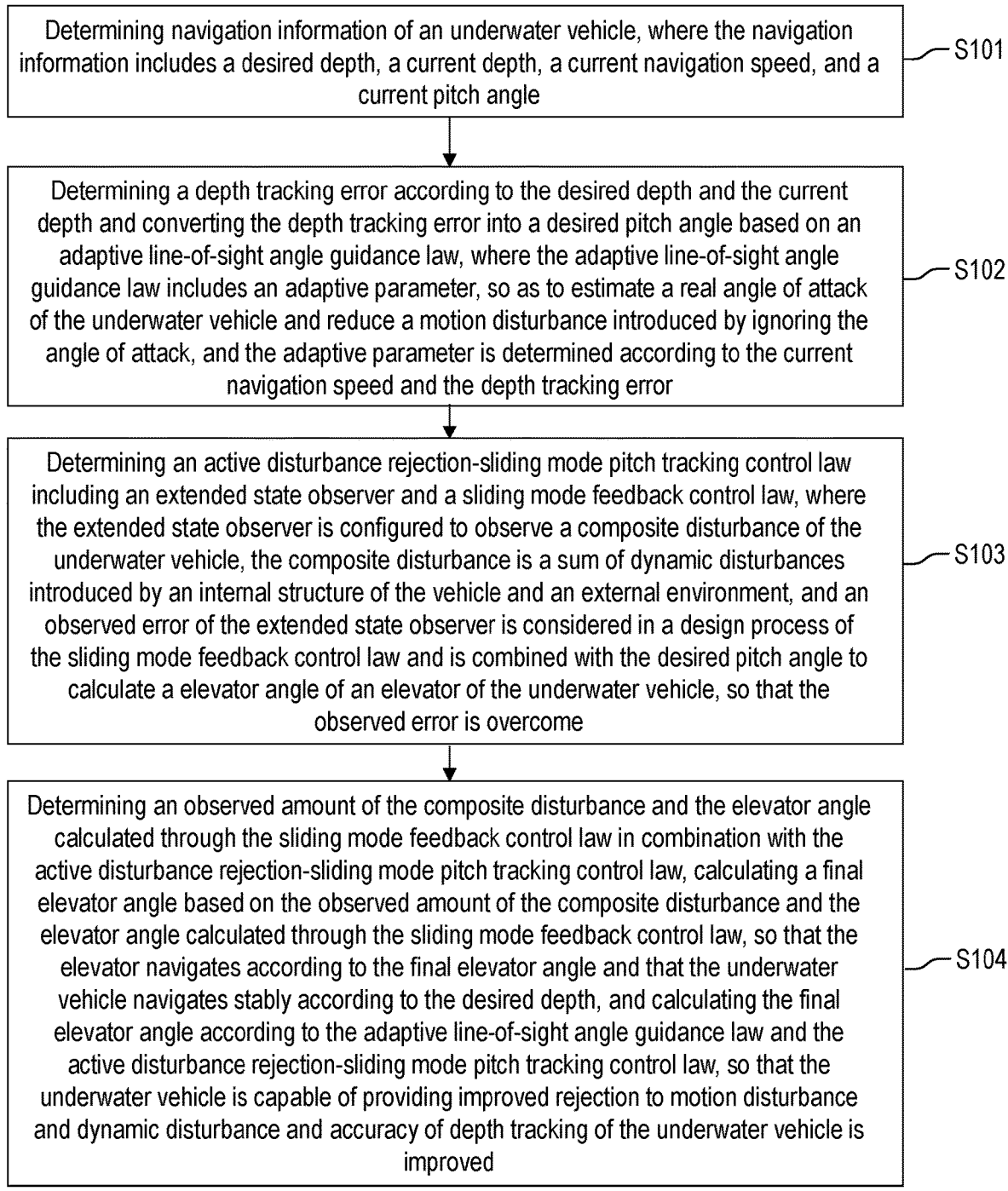
FIG. 1 is a flow chart of a method for hierarchical disturbance rejection depth tracking control of an underactuated underwater vehicle according to an embodiment of the disclosure.

FIG. 1 is a flow chart of a method for hierarchical disturbance rejection depth tracking control of an underactuated underwater vehicle according to an embodiment of the disclosure. As shown in FIG. 1, the method includes the following steps.

In S101, navigation information of the underwater vehicle is determined. The navigation information includes a desired depth, a current depth, a current navigation speed, and a current pitch angle.

In S102, a depth tracking error is determined according to the desired depth and the current depth, and the depth tracking error is converted into a desired pitch angle based on an adaptive line of sight guidance law. The adaptive line of sight guidance law includes an adaptive parameter, so as to estimate a real angle of attack of the underwater vehicle and reduce a motion disturbance introduced by ignoring the angle of attack. The adaptive parameter is determined according to the current navigation speed and the depth tracking error.

In S103, an active disturbance rejection sliding mode pitch tracking control law including an extended state observer and a sliding mode feedback control law is determined. The extended state observer is configured to observe a composite disturbance of the underwater vehicle. The composite disturbance is a sum of dynamic disturbances introduced by an internal structure of the vehicle and an external environment. An observation error of the extended state observer is considered in a design process of the sliding mode feedback control law and is combined with the desired pitch angle to calculate an elevator angle of the underwater vehicle, so that the observation error is overcome.

In S104, an observed amount of the composite disturbance and the elevator angle calculated through the sliding mode feedback control law in combination with the active disturbance rejection-sliding mode pitch tracking control law are determined. A final elevator angle is calculated based on the observed amount of the composite disturbance and the elevator angle calculated through the sliding mode feedback control law, so that the elevator navigates according to the final elevator angle, and that the underwater vehicle navigates stably according to the desired depth. The final elevator angle is calculated according to the adaptive line of sight guidance law and the active disturbance rejection sliding mode pitch tracking control law, so that the underwater vehicle is capable of providing improved rejection to motion disturbance and dynamic disturbance, and accuracy of depth tracking of the underwater vehicle is improved.

Figure 2:
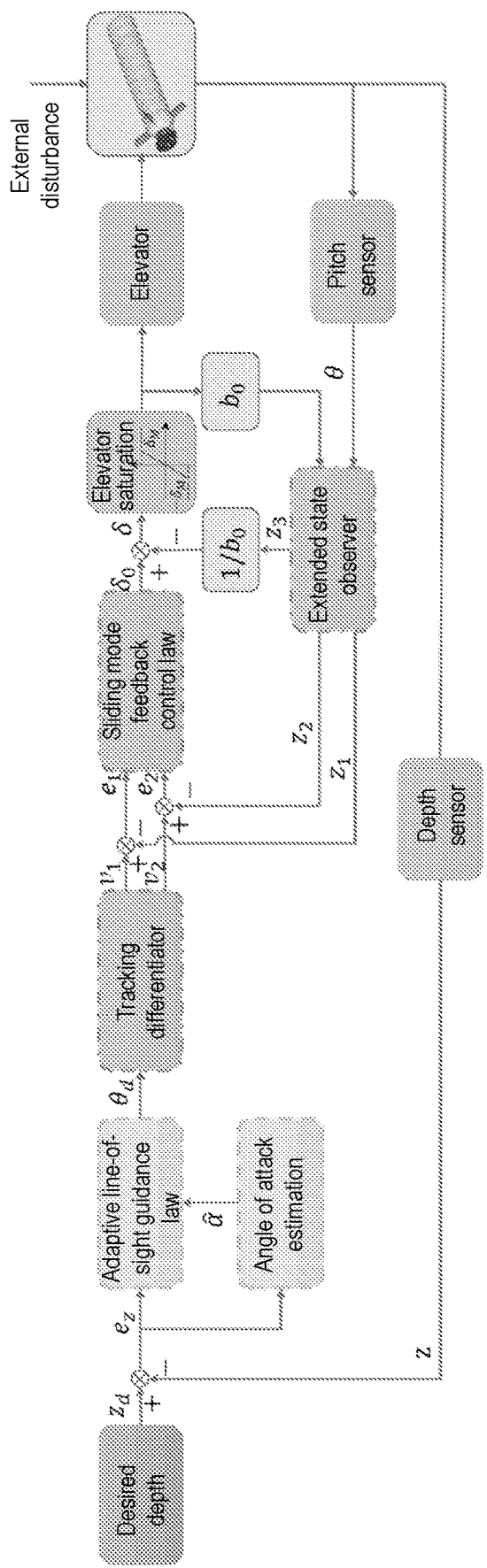
FIG. 2 is a block diagram of the method for hierarchical anti-disturbance depth tracking control of the underwater vehicle according to an embodiment of the disclosure.

FIG. 2 is a block diagram of the method for hierarchical disturbance rejection depth tracking control according to an embodiment of the disclosure.

As shown in FIG. 2, in the kinematic layer, in the adaptive line of sight guidance law, the depth tracking error $e_z$ is converted into the desired pitch $\theta_d$ according to formula (1) and outputted into the pitch tracking control law.

$$\theta_d = \tan^{-1}\left(\frac{e_z}{\Delta} + \hat{\alpha}\right). \quad (1)$$

In the formula, the depth tracking error is defined as the difference between the desired depth $z_d$ and the actual depth z, i.e., $e_z = z_d - z$. $\Delta$ is the forward-looking distance, is a manually adjustable parameter, and is generally 3 to 5 times the length of the vehicle. The guidance law introduces an adaptive parameter $\hat{\alpha}$ to estimate the true angle of attack of the vehicle. Since the real and accurate angle of attack cannot be obtained easily, the angle of attack is generally ignored in the currently-available control methods of vehicles. However, ignoring the angle of attack may cause a kinematic layer disturbance, and it is precisely because of the introduction of $\hat{\alpha}$ that the guidance law is capable of resisting the kinematic layer disturbance. $\hat{\alpha}$ changes adaptively according to formula (2).

$$\hat{\alpha} = \frac{\gamma U \Delta e_z}{\sqrt{\Delta^2 + (e_z + \Delta\hat{\alpha})^2}}, \quad (2)$$

where U is the navigation speed of the vehicle, $\gamma$ is the manually adjustable adaptive gain, and the adaptive parameter $\hat{\alpha}$ corresponds to the estimated angle of attack.

In the dynamic layer, the active disturbance rejection-sliding mode control method is used to construct the pitch tracking control law of formula (3), and the elevator angle $S$ is calculated. The active disturbance rejection sliding mode pitch tracking control law is formed by the extended state observer, the sliding mode feedback control law, and a tracking differentiator.

The composite disturbance including the internal unknown model and external environmental disturbance are observed by the extended state observer. The observed value $z_3$ of the composite disturbance is then substituted into formula (3), the complex pitch motion model is compensated as an integral series type, and that strong pitch disturbance rejection tracking is implemented.

$$\delta = \delta_0 - \frac{z_3}{b_0}, \quad (3)$$

where $\delta_0$ is the elevator angle calculated through the sliding mode feedback control law, so the observation error of the active disturbance rejection can be further resisted, and $b_0$ is the elevator effect coefficient, which is related to the vehicle motion model.

A pitch motion model of the underwater vehicle can be expressed as formula (4):

$$\ddot{\theta} = f(\theta, \dot{\theta}, U, I_{yy} \ldots) + b_0\delta + d_\theta \quad (4),$$

where $\ddot{\theta}$ represents the pitch angular acceleration rate, $f(\theta, \dot{\theta}, U, I_{yy} \ldots)$ represents the acceleration rate corresponding to the torque caused by the internal properties of the vehicle and is a time variable that changes with complex unknown factors such as the vehicle pitch $\theta$, pitch angular velocity $\dot{\theta}$, navigation speed U, and moment of inertia $I_{yy}$, and $d_\theta$ is the external unknown environmental disturbance.

The extended state observer (5) is used, and the complex and unknown total internal and external unknown amount $f(\theta, \dot{\theta}, U, I_{yy} \ldots) + d_\theta$ in formula (4) can be considered as a composite disturbance and calculated iteratively, represented by $z_3$.

$$\begin{cases} e = z_1[t] - \theta \\ z_1[t+1] = z_1[t] + h(z_2[t+1] - l_1 e) \\ z_2[t+1] = z_2[t] + h(z_3[t+1] - l_2 e + b_0\delta) \\ z_3[t+1] = z_3[t] + h(-l_3 e) \end{cases} \quad (5)$$

where $z_1$, $z_2$, and $z_3$ respectively are the estimates of the vehicle pitch angle $\theta$, the pitch angular velocity $\dot{\theta}$, and the internal and external unknown compound disturbance $f(\theta, \dot{\theta}, U, I_{yy} \ldots) + d_\theta$, [t] represents the iterative calculation of step t, h is the integration step size, and $l_1$, $l_2$ and $l_3$ are the observation gains of the observer.

The estimated value $z_3$ of the composite disturbance is substituted into the pitch control law (3), (3) is substituted into the complex pitch motion model (4), and the original complex controlled object is to be transformed into a simple integral series type $\ddot{\theta} = b_0\delta_0$. Therefore, regardless of changes in internal dynamics and external environmental disturbances, by using the extended state observer (5) and the pitch control law (3), the originally-controlled object is transformed into a unified integral series type. Therefore, the pitch tracking controller is capable of resisting the dynamic layer disturbance.

Since the extended state observer cannot guarantee that the observed value $z_3$ can perfectly converge to the true value $f(\theta, \dot{\theta}, U, I_{yy} \ldots) + d_\theta$, the presence of the observation error is considered in the process of feedback control law design. The feedback control law adopts the design idea of sliding mode control to further overcome the observation error.

First, a sliding mode surface $s = ce_1 + e_2$ is defined, where c is the weight coefficient, weighing the contributions of $e_1$ and $e_2$, $e_1$ is the pitch angle tracking error, and $e_2$ is the pitch angular velocity tracking error. The sliding mode feedback control law is obtained according to an exponential reaching law design method $\dot{s} = -ks - \eta \text{sign}(s)$:

$$\delta_0 = \frac{1}{b_0}(ce_2 + ks + \eta\text{sign}(s)), \quad (6)$$

where the k parameter controls the rate at which the error converges to zero exponentially, and $\eta$ is the coefficient of the robust term to overcome the observation error.

A tracking differentiator (7) configured to obtain a numerical differential $v_2$ of the desired pitch angle is used, and a tracking signal $v_1$ of the desired pitch angle is obtained. Finally, the formulas for calculating the error in formula (6) are $e_1 = v_1 - z_1$ and $e_2 = v_2 - z_2$.

$$\begin{cases} v_1[t+1] = v_1[t] + hv_2[t+1] \\ v_2[t+1] = v_2[t] + h \cdot fhan(x_1, x_2, r, h) \end{cases}, \quad (7)$$

where r is the tracking acceleration coefficient, h is the calculation step size, and [t] represents the iterative calculation of step t. $fhan(x_1, x_2, r, h)$ is the fastest control comprehensive function, and $x_1$ and $x_2$ are intermediate variables respectively represented as $x_1 = v_1[t] - \theta_d$ and $x_2 = v_2[t]$.

$$\begin{cases} d = rh \\ d_0 = hd \\ y = x_1 + hx_2 \\ a_0 = \sqrt{d^2 + 8r|y|} \\ a = \begin{cases} x_2 + \dfrac{a_0 - d}{2} \operatorname{sign}(y), & |y| > d_0 \\ x_2 + \dfrac{y}{h}, & |y| \le d_0 \end{cases} \\ fhan(x_1, x_2, r, h) = -\begin{cases} r\operatorname{sign}(a), & |a| > d \\ r\dfrac{a}{d}, & |a| \le d \end{cases} \end{cases} \quad (8)$$

In order to achieve the above, the disclosure designs a system for hierarchical disturbance rejection depth tracking control of an underactuated underwater vehicle. A conversion program of formulas (1) to (3) and (5) to (8) is deployed on an on-board computer of the vehicle. The computer calls the program, automatically reads depth data z of a depth sensor and pitch angle data θ fed back by a pitch sensor, and runs a depth tracking control algorithm program. The calculated elevator command δ is used to control an executive steering engine to form a hierarchical disturbance rejection depth tracking control system for the vehicle, so that high-accuracy robust depth-tracking navigation of an underwater autonomous vehicle under disturbance is implemented.

Figure 3:
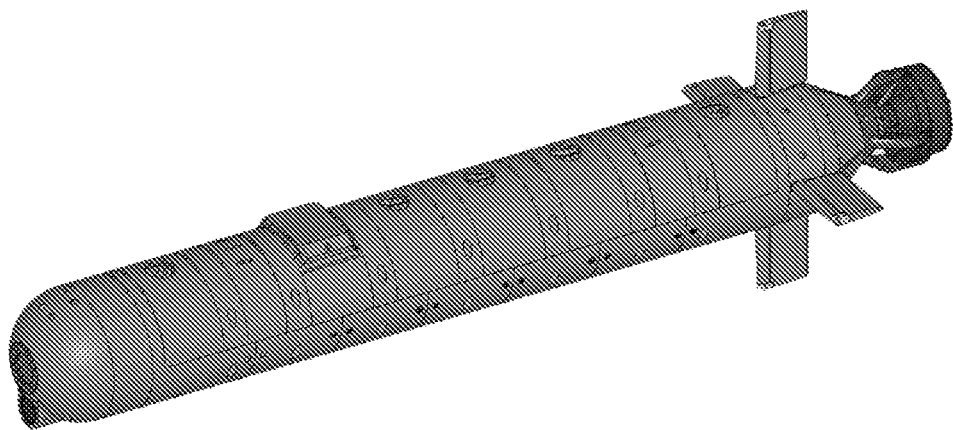
FIG. 3 is a schematic view of a typical underactuated autonomous underwater vehicle according to an embodiment of the disclosure.

In order to verify the depth tracking effect and the disturbance rejection capability of the method provided by the disclosure, a typical underactuated autonomous underwater vehicle as shown in FIG. 3 is used as a test platform. The underwater autonomous vehicle moves in the depth plane only with the thrust provided by a propeller and the pitch control moment provided by an elevator. The number of control forces is less than the number of degrees of freedom, so an underactuated characteristic is provided. The platform is capable of providing depth and pitch angle feedback, and an elevator is provided at the stern that can be used to control the pitch angle, so that a hierarchical disturbance rejection depth tracking control system to verify the hierarchical disturbance rejection depth tracking control method is suitable to be formed. A closed-loop control code is written in the on-board computer of the autonomous underwater vehicle to implement the functions of autonomous collection of sensor data and control of the elevator. The code specifically implements the hierarchical disturbance rejection depth tracking control method of formulas (1) to (3) and (5) to (8).

The desired depth first ramps to 2 meters and then remains at 2 meters for 60 seconds. The vehicle runs this method to track the desired depth to implement the submergence action and then conduct depth-fixed navigation. After the mission, the vehicle tracks the desired depth and floats autonomously. The real-prototype test results are shown in FIG. 4a to FIG. 4e.

Figure 4A:
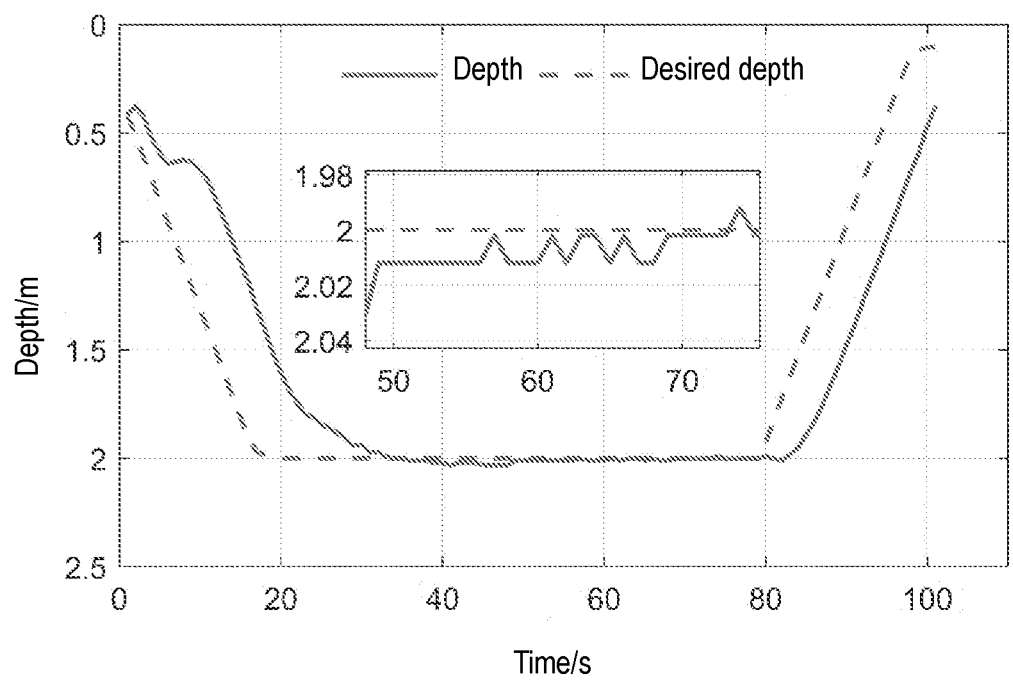
FIG. 4a is curve graph of depth tracking in a real-prototype test according to an embodiment of the disclosure.
Figure 4B:
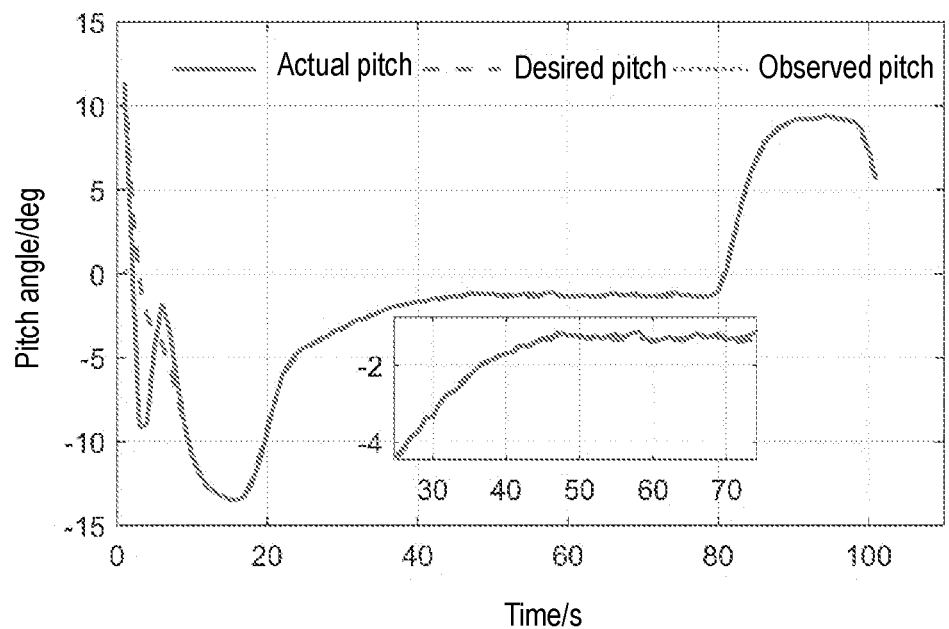
FIG. 4b is curve graph of pitch tracking and observed pitch in the real-prototype test according to an embodiment of the disclosure.

FIG. 4a shows the curve graph of depth of the vehicle, and the actual depth of the vehicle eventually converges to the desired depth of 2 meters without deviation. High-accuracy depth tracking performance is guaranteed by good pitch tracking and estimation and compensation for angle of attack by guidance law. The pitch tracking performance of the vehicle is shown in FIG. 4b, and it can be seen that the pitch angle of the vehicle can perfectly track the desired pitch angle. The performance is guaranteed by the observation and compensation of the composite disturbance by the extended state observer as well as the observation error compensation of the sliding mode feedback control law. After 50 seconds, the vehicle enters into a stabilized navigation stage, and the pitch angle is stabilized at −1.4°.

Figure 4C:
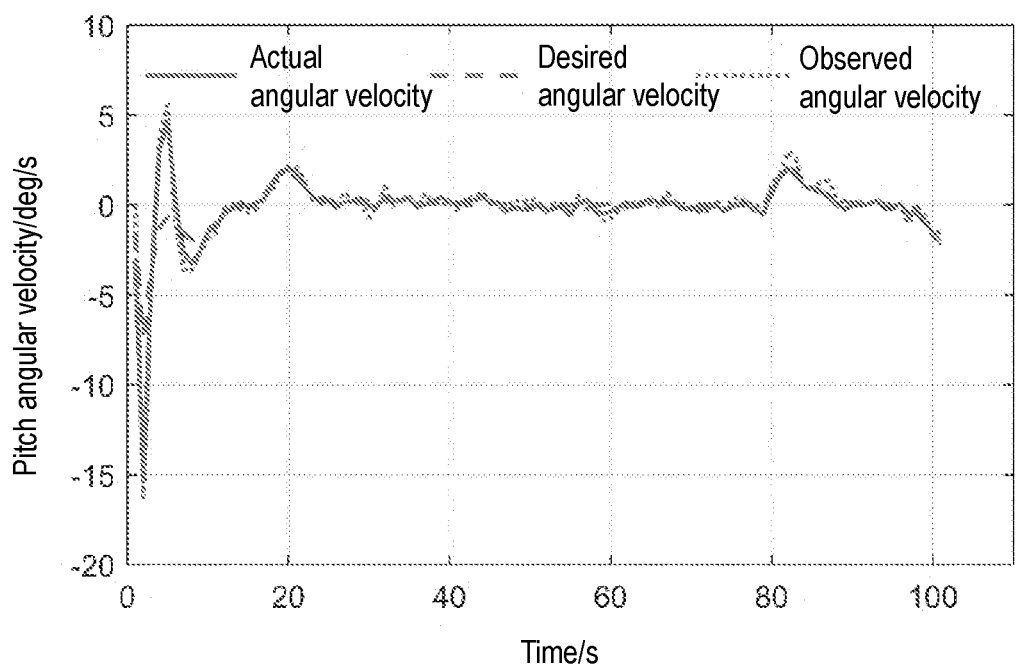
FIG. 4c is curve graph of pitch angular velocity tracking and observed angular velocity in the real-prototype test according to an embodiment of the disclosure.
Figure 4D:
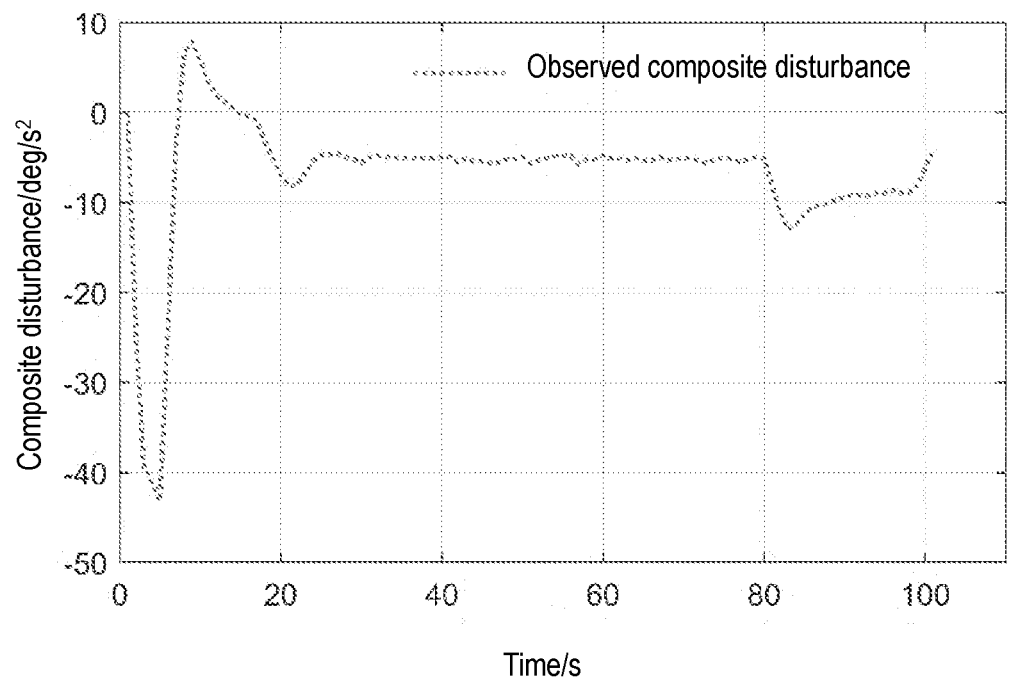
FIG. 4d is curve graph of composite disturbance observed values in the real-prototype test according to an embodiment of the disclosure.
Figure 4E:
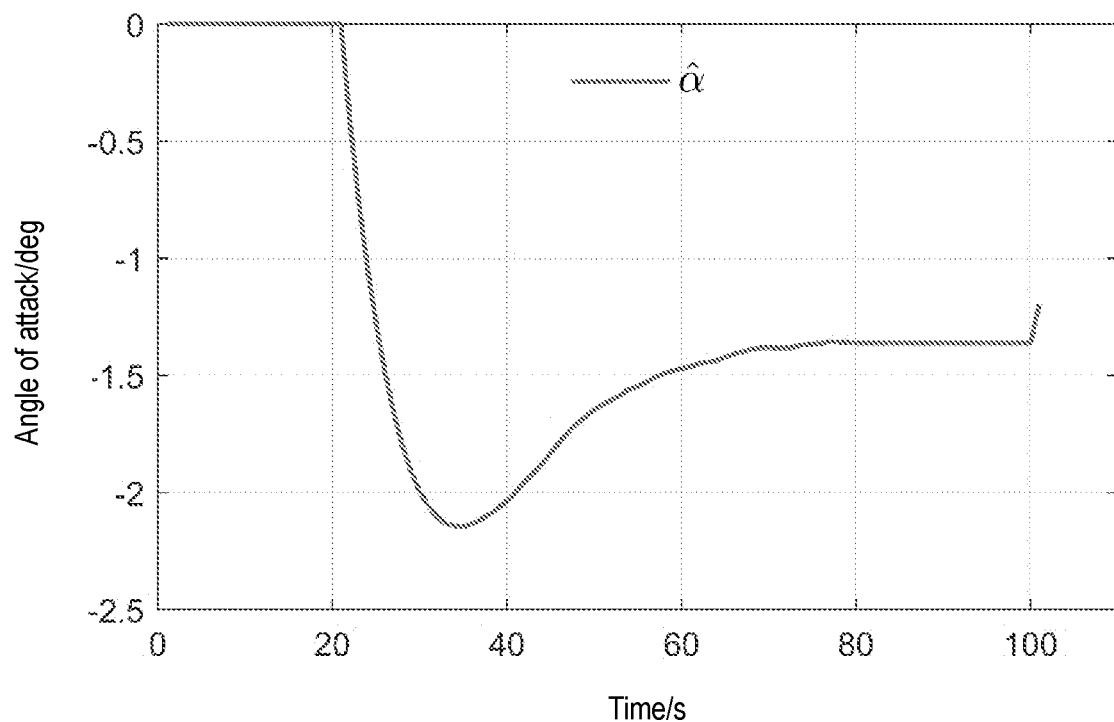
FIG. 4e is curve graph of estimated values of the angle of attack in the real-prototype test according to an embodiment of the disclosure.

FIG. 4b and FIG. 4c respectively show that the observed pitch angle $z_1$ converges to the actual pitch angle θ and the observed angular velocity $z_2$ converges to the actual angular velocity $\dot{\theta}$. Therefore, it can be deduced that the observed composite disturbance $z_3$ shown in FIG. 4d also converges to the true composite disturbance $f(\theta, \dot{\theta}, U, I_{yy} \ldots) + d_\theta$. It is precisely because the extended state observer can effectively estimate the composite disturbance and compensate the complex pitch motion model into an integral series type, that the actual pitch angle can unbiasedly track the desired pitch angle. Since an underwater autonomous vehicle is generally configured with slightly positive buoyancy, the vehicle needs a certain angle of attack to balance the remaining buoyancy after the depth is stable. If the line of sight guidance is used and the influence of the angle of attack is ignored, disturbances may be introduced in the kinematic layer, resulting in a steady-state error in depth. The adaptive line of sight guidance can estimate and compensate the angle of attack in real time, and the estimated angle of attack in real time is shown in FIG. 4e. With reference to FIG. 4e and FIG. 4a together, after 50 seconds, the vehicle enters the depth-stabilized navigating stage. In the depth-stabilized navigating stage, the depth of the vehicle remains constant, and the elevation angle is 0° at this time. The estimated angle of attack after 65 seconds is −1.4°, which is approximately equal to the pitch angle shown in FIG. 4b and is in line with the motion characteristic of the vehicle. It is thus verified that the adaptive line of sight guidance can effectively estimate the angle of attack.

Figure 5:
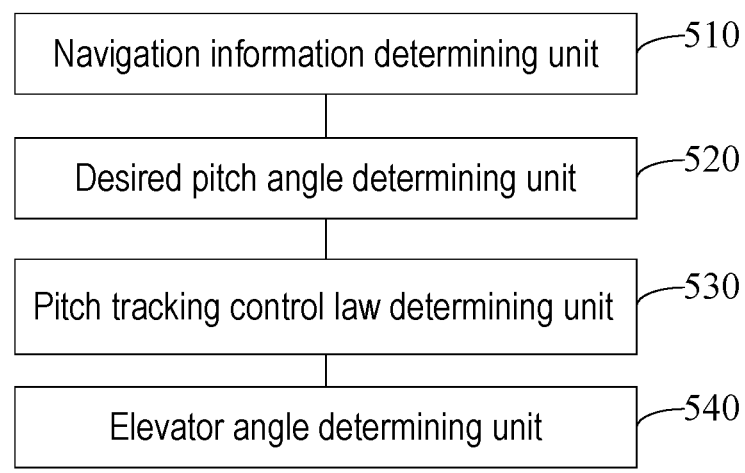
FIG. 5 is a structural diagram of a system for hierarchical disturbance rejection depth tracking control of an underactuated underwater vehicle according to an embodiment of the disclosure.

FIG. 5 is a structural diagram of a system for hierarchical disturbance rejection depth tracking control of an underactuated underwater vehicle according to an embodiment of the disclosure. As shown in FIG. 5, the system includes:

The navigation information determining unit 510 is configured to determine navigation information of the underwater vehicle. The navigation information includes a desired depth, a current depth, a current navigation speed, and a current pitch angle.

The desired pitch angle determining unit 520 is configured to determine a depth tracking error according to the desired depth and the current depth and convert the depth tracking error into a desired pitch angle based on an adaptive line of sight guidance law. The adaptive line of sight guidance law includes an adaptive parameter, so as to estimate a real angle of attack of the underwater vehicle and reduce a motion disturbance introduced by ignoring the angle of attack. The adaptive parameter is determined according to the current navigation speed and the depth tracking error.

The pitch tracking control law determining unit 530 is configured to determine an active disturbance rejection sliding mode pitch tracking control law including an extended state observer and a sliding mode feedback control law. The extended state observer is configured to observe a composite disturbance of the underwater vehicle. The composite disturbance is a sum of dynamic disturbances introduced by an internal structure of the vehicle and an external environment. An observation error of the extended state observer is considered in a design process of the sliding mode feedback control law and is combined with the desired pitch angle to calculate a elevator angle of the underwater vehicle, so that the observation error is overcome.

The elevator angle determining unit 540 is configured to determine an observed amount of the composite disturbance and the elevator angle calculated through the sliding mode feedback control law in combination with the active disturbance rejection sliding mode pitch tracking control law. Further, the elevator angle determining unit 540 calculates a final elevator angle based on the observed amount of the composite disturbance and the elevator angle calculated through the sliding mode feedback control law, so that the elevator navigates according to the final elevator angle, and that the underwater vehicle navigates stably according to the desired depth. The elevator angle determining unit 540 calculates the final elevator angle according to the adaptive line of sight guidance law and the active disturbance rejection sliding mode pitch tracking control law, so that the underwater vehicle is capable of providing improved rejection to motion disturbance and dynamic disturbance, and accuracy of depth tracking of the underwater vehicle is improved.

It can be understood that the detailed functional implementation of the foregoing units in FIG. 5 may be found with reference to the introduction in the foregoing method embodiments, and description thereof is not repeated herein.

To sum up, the above technical solutions provided by the disclosure have the following beneficial effects compared with the related art.

The disclosure provides a method and system for hierarchical disturbance rejection depth tracking control of an underactuated underwater vehicle, and the depth tracking of the underactuated underwater vehicle is divided into kinematic layer guidance and dynamic layer pitch tracking. The adaptive line of sight guidance is used in the kinematic layer to convert the depth error into the desired pitch angle and to estimate and compensate the angle of attack to reject the disturbance introduced by the unmeasurable true angle of attack. Based on the above, in the dynamic layer, the active disturbance rejection sliding mode pitch tracking method is used to observe the composite disturbance including an unknown dynamic model and the environmental disturbance by using the active disturbance rejection framework. The model is compensated as a unified integral series type, the sliding mode control law is finally designed to resist the observation error, and the control elevator angle is calculated. The abovementioned control method is deployed on the on-board computer of the vehicle, so that the depth and pitch angle data fed back by the sensor is read, the elevator actuator is controlled, the system for hierarchical disturbance rejection depth tracking control is formed, and the robust depth tracking navigation of the vehicle is implemented.

A person having ordinary skill in the art should be able to easily understand that the above description is only preferred embodiments of the disclosure and is not intended to limit the disclosure. Any modifications, equivalent replacements, and modifications made without departing from the spirit and principles of the disclosure should fall within the protection scope of the disclosure.

What is claimed is:

1. A method for hierarchical disturbance rejection depth tracking control of an underactuated underwater vehicle, comprising:
   determining navigation information of the underwater vehicle, wherein the navigation information comprises a desired depth, a current depth, a current navigation speed, and a current pitch angle;
   determining a depth tracking error according to the desired depth and the current depth and converting the depth tracking error into a desired pitch angle based on an adaptive line-of-sight guidance law, specifically comprises:
   subtracting a current depth z from a desired depth $z_d$ to obtain the depth tracking error $e_z$;
   converting the depth tracking error $e_z$ into a desired pitch angle $\theta_d$ based on the adaptive line-of-sight guidance law specifically through the following formula:

$$\theta_d = \tan^{-1}\left(\frac{e_z}{\Delta} + \hat{\alpha}\right),$$

where $\Delta$ is the forward-looking distance, and $\hat{\alpha}$ is the adaptive parameter,
wherein the adaptive line-of-sight guidance law comprises an adaptive parameter, so as to estimate a real angle of attack of the underwater vehicle and reduce a motion disturbance introduced by ignoring the angle of attack, and the adaptive parameter is determined according to the current navigation speed and the depth tracking error;
determining an active disturbance rejection sliding mode pitch tracking control law comprising an extended state observer and a sliding mode feedback control law; wherein the extended state observer is configured to observe a composite disturbance of the underwater vehicle, specifically comprises: a pitch motion model of the underwater vehicle is:

$$\ddot{\theta} = f(\theta, \dot{\theta}, U, I_{yy} \ldots) + b_0\delta + d_\theta,$$

where $\ddot{\theta}$ represents the pitch angular acceleration rate, $f(\theta, \dot{\theta}, U, I_{yy} \ldots)$ represents the acceleration rate corresponding to the moment caused by the internal structure of the vehicle, $\theta$ represents the vehicle pitch angle, $\dot{\theta}$ represents the vehicle pitch angular velocity, U represents the navigation speed, $I_{yy}$ represents the moment of inertia of the vehicle, $d_\theta$ is the external environment disturbance, $b_0$ is the elevator effect coefficient, and $\delta$ is the final elevator angle,
considering $f(\theta, \dot{\theta}, U, I_{yy} \ldots) + d_\theta$ as a composite disturbance and using the following extended state observer to iteratively calculate the composite disturbance:

$$\begin{cases} e = z_1[t] - \theta \\ z_1[t+1] = z_1[t] + h(z_2[t+1] - l_1 e) \\ z_2[t+1] = z_2[t] + h(z_3[t+1] - l_2 e + b_0\delta) \\ z_3[t+1] = z_3[t] + h(-l_3 e) \end{cases},$$

where $z_1$, $z_2$, and $z_3$ respectively are observed amounts of the vehicle pitch angle $\theta$, the pitch angular velocity $\dot{\theta}$, and the compound disturbance $f(\theta, \dot{\theta}, U, I_{yy} \ldots) + d_\theta$, [t] represents the iterative calculation of step t, h is the integration step size, and $l_1$, $l_2$ and $l_3$ are the observation gains of the extended state observer,
the composite disturbance is a sum of dynamic disturbances introduced by an internal structure of the vehicle and an external environment, the active disturbance rejection sliding mode pitch tracking control law further comprises: a tracking differentiator, configured to determine a numerical differential $v_2$ of the desired pitch angle and a tracking signal $v_1$ of the desired pitch angle, and an observation error of the extended state observer is considered in a design process of the sliding mode feedback control law and is combined with the desired pitch angle to calculate a elevator angle of the underwater vehicle, so that the observation error is overcome, specifically is:

defining a sliding mode surface $s=ce_1+e_2$, where c is the weight coefficient, $e_1$ is the pitch angle tracking error, $e_1=v_1-z_1$, $e_2$ is the pitch angular velocity tracking error, and $e_2=v_2-z_2$;

obtaining the sliding mode feedback control law according to an exponential reaching law design method:

$$\delta_0 = \frac{1}{b_0}(ce_2 + ks + \eta \text{sign}(s)),$$

where $\delta_0$ is the elevator angle calculated through the sliding mode feedback control law, the k parameter controls the rate at which the error converges to zero exponentially, and $\eta$ is the coefficient of the robust term to overcome the observation error; and determining an observed amount of the composite disturbance and the elevator angle calculated through the sliding mode feedback control law in combination with the active disturbance rejection sliding mode pitch tracking control law, calculating a final elevator angle $\delta$, specifically to be $$\delta = \delta_0 - \frac{z_3}{b_0}$$

of the elevator based on the observed amount of the composite disturbance and the elevator angle calculated through the sliding mode feedback control law, so that the elevator navigates according to the final elevator angle and that the underwater vehicle navigates stably according to the desired depth, and calculating the final elevator angle according to the adaptive line of sight guidance law and the active disturbance rejection sliding mode pitch tracking control law, so that the underwater vehicle is capable of providing improved rejection to motion disturbance and dynamic disturbance and accuracy of depth tracking of the underwater vehicle is improved.

2. The method according to claim 1,

Wherein $\hat{\alpha}$ changes adaptively according to the following formula:

$$\hat{\alpha} = \frac{\gamma U \Delta e_z}{\sqrt{\Delta^2 + (e_z + \Delta \hat{\alpha})^2}},$$

where U is the navigation speed of the vehicle, and $\gamma$ is the adaptive gain.

3. The method according to claim 1, further comprising: calculating $v_1$ and $v_2$ through the following formula:

$$\begin{cases} v_1[t+1] = v_1[t] + hv_2[t+1] \\ v_2[t+1] = v_2[t] + h \cdot \text{fhan}(x_1, x_2, r, h) \end{cases},$$

where r is the tracking acceleration coefficient, h is the calculation step size, [t] represents the iterative calculation of step t, $\text{fhan}(x_1, x_2, r, h)$ is the fastest control comprehensive function, $x_1$ and $x_2$ are intermediate variables expressed as $x_1=v_1[t]-\theta_d$ and $x_2=v_2[t]$ respectively, and $\theta_d$ is the desired pitch angle, wherein $\text{fhan}(x_1, x_2, r, h)$ is calculated through the following formula:

$$\begin{cases} d = rh \\ d_0 = hd \\ y = x_1 + hx_2 \\ a_0 = \sqrt{d^2 + 8r|y|} \\ a = \begin{cases} x_2 + \frac{a_0-d}{2}\text{sign}(y), & |y| > d_0 \\ x_2 + \frac{y}{h}, & |y| \le d_0 \end{cases} \\ \text{fhan}(x_1, x_2, r, h) = -\begin{cases} r\text{sign}(a), & |a| > d \\ r\frac{a}{d}, & |a| \le d \end{cases} \end{cases},$$

where d, $d_0$, $\gamma$, $\alpha_0$, and $\alpha$ are all intermediate variables.

4. A system for hierarchical disturbance rejection depth tracking control of an underactuated underwater vehicle, comprising:

a navigation information determining unit configured to determine navigation information of the underwater vehicle, wherein the navigation information comprises a desired depth, a current depth, a current navigation speed, and a current pitch angle;

a desired pitch angle determining unit configured to determine a depth tracking error according to the desired depth and the current depth and convert the depth tracking error into a desired pitch angle based on an adaptive line of sight guidance law, specifically comprises: subtracting a current depth z from a desired depth $z_d$ to obtain the depth tracking error $e_z$; converting the depth tracking error $e_z$ into a desired pitch angle $\theta_d$ based on the adaptive line of sight guidance law specifically through the following formula:

$$\theta_d = \tan^{-1}\left(\frac{e_z}{\Delta} + \hat{\alpha}\right),$$

where $\Delta$ is the forward-looking distance, and $\hat{\alpha}$ is the adaptive parameter; wherein the adaptive line of sight guidance law comprises an adaptive parameter, so as to estimate a real angle of attack of the underwater vehicle and reduce a motion disturbance introduced by ignoring the angle of attack, and the adaptive parameter is determined according to the current navigation speed and the depth tracking error;

a pitch tracking control law determining unit configured to determine an active disturbance rejection sliding mode pitch tracking control law comprising an extended state observer and a sliding mode feedback control law, wherein the extended state observer is configured to observe a composite disturbance of the underwater vehicle, specifically comprises:

a pitch motion model of the underwater vehicle is:

$$\ddot{\theta}=f(\theta,\dot{\theta},U,I_{yy}\ldots)+b_0\delta+d_\theta,$$

where $\ddot{\theta}$ represents the pitch angular acceleration rate, $f(\theta, \dot{\theta}, U, I_{yy} \ldots)$ represents the acceleration rate corresponding to the moment caused by the internal structure of the vehicle, $\theta$ represents the vehicle pitch angle, $\dot{\theta}$ represents the vehicle pitch angular velocity, U represents the navigation speed, $I_{yy}$ represents the moment of inertia of the vehicle, $d_\theta$ is the external environment disturbance, $b_0$ is the elevator effect coefficient, and $\delta$ is the final elevator angle, considering $f(\theta, \dot{\theta}, U, I_{yy} \ldots )+d_\theta$ as a composite disturbance and using the following extended state observer to iteratively calculate the composite disturbance:

$$\begin{cases} e = z_1[t] - \theta \\ z_1[t+1] = z_1[t] + h(z_2[t+1] - l_1 e) \\ z_2[t+1] = z_2[t] + h(z_3[t+1] - l_2 e + b_0 \delta) \\ z_3[t+1] = z_3[t] + h(-l_3 e) \end{cases},$$

where $z_1$, $z_2$, and $z_3$ respectively are observed amounts of the vehicle pitch angle $\theta$, the pitch angular velocity $\dot{\theta}$, and the compound disturbance $f(\theta,\dot{\theta},U,I_{yy}\ldots )+d\theta$, [t] represents the iterative calculation of step t, h is the integration step size, and $l_1$, $l_2$ and $l_3$ are the observation gains of the extended state observer, the composite disturbance is a sum of dynamic disturbances introduced by an internal structure of the vehicle and an external environment, the active disturbance rejection sliding mode pitch tracking control law further comprises: a tracking differentiator, configured to determine a numerical differential $v_2$ of the desired pitch angle and a tracking signal $v_1$ of the desired pitch angle, and an observation error of the extended state observer is considered in a design process of the sliding mode feedback control law and is combined with the desired pitch angle to calculate a elevator angle of the underwater vehicle, so that the observation error is overcome, specifically comprises: defining a sliding mode surface $s=ce_1+e_2$, where c is the weight coefficient, $e_1$ is the pitch angle tracking error, $e_1=v_1-z_1$, $e_2$ is the pitch angular velocity tracking error, and $e_2=v_2-z_2$; obtaining the sliding mode feedback control law according to an exponential reaching law design method:

$$\delta_0 = \frac{1}{b_0}(ce_2 + ks + \eta\text{sign}(s)),$$

where $\delta_0$ is the elevator angle calculated through the sliding mode feedback control law, the k parameter controls the rate at which the error converges to zero exponentially, and $\eta$ is the coefficient of the robust term to overcome the observation error; and an elevator angle determining unit configured to determine an observed amount of the composite disturbance and the elevator angle calculated through the sliding mode feedback control law in combination with the active disturbance rejection sliding mode pitch tracking control law, calculate a final elevator angle $\delta$, specifically to be $$\delta = \delta_0 - \frac{z_3}{b_0}$$

of the elevator based on the observed amount of the composite disturbance and the elevator angle calculated through the sliding mode feedback control law, so that the elevator navigates according to the final elevator angle and that the underwater vehicle navigates stably according to the desired depth, and calculate the final elevator angle according to the adaptive line of sight guidance law and the active disturbance rejection sliding mode pitch tracking control law, so that the underwater vehicle is capable of providing improved rejection to motion disturbance and dynamic disturbance and accuracy of depth tracking of the underwater vehicle is improved.

5. The system according to claim 4, wherein the desired pitch angle determining unit includes parameter $\hat{\alpha}$ changes adaptively according to the following formula:

$$\hat{\alpha} = \frac{\gamma U \Delta e_z}{\sqrt{\Delta^2 + (e_z + \Delta\hat{\alpha})^2}},$$

where U is the navigation speed of the vehicle, and $\gamma$ is the adaptive gain.

6. The system according to claim 4, wherein the pitch tracking control law determining unit calculating $v_1$ and $v_2$ through the following formula:

$$\begin{cases} v_1[t+1] = v_1[t] + hv_2[t+1] \\ v_2[t+1] = v_2[t] + h \cdot fhan(x_1, x_2, r, h) \end{cases},$$

where r is the tracking acceleration coefficient, h is the calculation step size, [t] represents the iterative calculation of step t, $fhan(x_1, x_2, r, h)$ is the fastest control comprehensive function, $x_1$ and $x_2$ are intermediate variables expressed as $x_1=v_1[t]-\theta_d$ and $x_2=v_2$ [t] respectively, and $\theta_d$ is the desired pitch angle, wherein $fhan(x_1, x_2, r, h)$ is calculated through the following formula:

$$\begin{cases} d = rh \\ d_0 = hd \\ y = x_1 + hx_2 \\ a_0 = \sqrt{d^2 + 8r|y|} \\ a = \begin{cases} x_2 + \frac{a_0 - d}{2}\text{sign}(y), & |y| > d_0 \\ x_2 + \frac{y}{h}, & |y| \le d_0 \end{cases} \\ fhan(x_1, x_2, r, h) = -\begin{cases} r\text{sign}(a), & |a| > d \\ r\frac{a}{d}, & |a| \le d \end{cases} \end{cases}$$

where d, $d_0$, $\gamma$, $\alpha_0$, and $\alpha$ are all intermediate variables.

* * * * *